Sept. 14, 1965       M. PRATS ET AL       3,205,946
CONSOLIDATION BY SILICA COALESCENCE
Filed March 12, 1962

INVENTORS:
MICHAEL PRATS
TYLER W. HAMBY, JR.

BY: *John K. Wilkens*

THEIR ATTORNEY 3,205,946
CONSOLIDATION BY SILICA COALESCENCE
Michael Prats and Tyler W. Hamby, Jr., Houston, Tex., assignors to Shell Oil Company, New York, N.Y., a corporation of Delaware
Filed Mar. 12, 1962, Ser. No. 178,856
9 Claims. (Cl. 166—25)

The present invention is directed to a method of reducing the intrusion of granular formation aggregates in wells through consolidation of siliceous (e.g., silica bearing) producing formations. More particularly, the invention is directed to a method of consolidating a portion of unconsolidated earth formation which is disposed to intrude into a well by dissolving silica in a hot aqueous liquid and precipitating the silica on solid components of the unconsolidated earth formation. The aqueous liquid is heated to a temperature exceeding the formation temperature and is brought into contact with silica (generally in the form of sand) in the vicinity of the formation The resulting solution is cooled to the formation temperature while the solution is in contact with solid components of the unconsolidated earth formation.

The instrusion of granular formation aggregates, particularly sand, in wells is objectionable because the intruding aggregate is carried with and contaminates the fluid withdrawn from the well. The contaminated fluid, in turn, acts to "sand up" the well and to foul and abrade working parts of the well equipment. In addition, granular aggregates suspended in the fluid withdrawn from the well result in increased processing expenses with regard to the installation, operation and maintenance of treating equipment used to remove the aggregates from the withdrawn fluid.

Control of granular aggregate intrusion through consolidation is not, in itself, new. Consolidation has been accomplished by injecting chemical reagents and/or sealing compounds, such as plastics, into producing formations. Although these injections are effective to some extent, they have the disadvantage of being relatively expensive, since large volumes of injection fluid are generally required. The effectiveness of the injection is also limited in formations of varying permeabilities, since relatively impermeable formations are not susceptible to fluid injection. Furthermore, if the injected material is prone to wash away, the effective life of the consolidation may be limited.

It has also been suggested that consolidation of unconsolidated formations could be accomplished by heating the formation to the point of fusion. Although possible, this method is highly impractical, since apparatus with heating capacity sufficient to fuse large areas within a borehole is not known to be commercially available. Furthermore, even assuming such heating apparatus could be made available, it is apparent that the operation thereof would be extremely expensive with regard to the amounts of time and energy required to raise thick intervals to fusion temperature. Heating sand formations to the point of fusion also has the disadvantage that the fused formation is likely to form a completely impermeable mass and, therefore, require perforation and/or fracturing to facilitate production of fluid therethrough.

An object of the present invention is, therefore, to reduce the intrusion of granular formation aggregates in wells.

Another object of this invention is to provide an improved method of consolidating oil producing formations.

A further object of this invention is to provide a relatively inexpensive method of effectively producing a lasting and permeable consolidatel formation.

Still another object of this invention is to provide a method of consolidating a formation which does not necessitate the injection of a fluid or the attainment of the temperature of fusion of the formation.

These and other objects will become apparent from the following description and accompanying illustration of the invention.

In a broad aspect, the present invention provides a method of consolidating granular aggregates in a siliceous formation that contains interstitial water. The method includes raising the temperature of the formation and the interstitial water to a point where a portion of the silica is dissolved in the water and forms an aqueous solution therewith; and lowering the temperature of the resulting aqueous solution to permit the dissolved silica to precipitate into the interstices between the granular aggregates of the formation.

The invention will now be described with reference to the accompanying drawing, in which.

Figure 1:
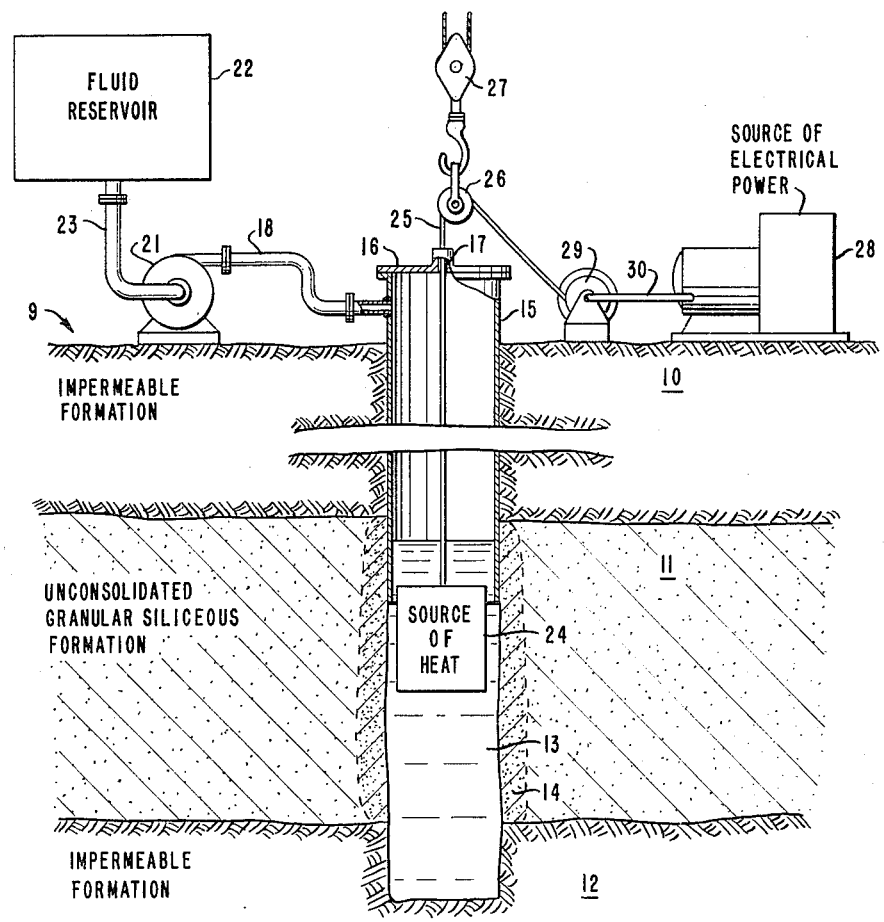
FIGURE 1 is an elevational view of a borehole, diagrammatically illustrating an application of the method of the present invention. In order to clarify the illustration, the borehole is shown in section and the structure secured to the lift hook shown in the upper part of the figure is not shown.

In the drawings, the numeral 9 designates a portion of the earth including an impermeable upper formation 10, a subsurface unconsolidated granular siliceous formation 11 and a subsurface impermeable formation 12. A borehole 13 is formed in the earth and extends from the surface thereof through the impermeable formation 10 and the unconsolidated formation 11 into the impermeable formation 12. The numeral 14 designates a consolidated portion of the siliceous formation surrounding the borehole 13.

A casing string 15 extends from above the surface of the earth into the borehole 13. It is to be understood that the length of the casing string 15 may vary without departing from the method of the present invention. A cap 16 having an opening 17 extending therethrough is sealingly secured to the upper end of the casing string 15. A conduit 18 communicates between the upper end of the casing string 15 and the outlet of a pump 21. Pump 21 has an inlet connected to a fluid reservoir 22 through a conduit 23. Through this arrangement, the pump 21 may be activated to pump fluid from the reservoir 22 to the casing string 15 and into the unconsolidated formation 11.

A source of heat 24 is suspended within the borehole 13 by a line 25. Line 25 extends upwardly through the opening 17 into engagement with a pulley 26. Pulley 26 is, in turn, secured to a traveling block 27 suspended from a raising and lowering mechanism (not shown).

In the illustrated construction, the source of heat 24 is an electrically activated heater. Line 25 acts as a conduit for electrical current as well as a suspension means for the weight of the source of heat 24. The line 25 extends over the pulley 26 and is connected to a source of electrical power 28 through a reeling mechanism 29 and a conduit 30. It is to be understood that the method of the present invention is not limited to the use of the electrical heater and the actuation means therefor shown in the illustration.

Figure 2:
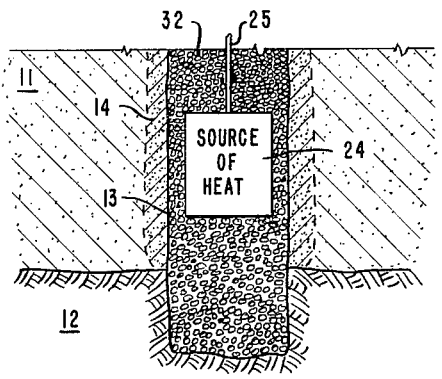
FIGURE 2 illustrates a segment of a borehole corresponding to that of FIGURE 1, showing a variation of the method of the present invention. The formation and structure broken away from the upper part of the figure is identical to that of FIGURE 1.

FIGURE 2 illustrates the lower end of a borehole corresponding to that of FIGURE 1. The structure broken away from the upper part of this figure is identical to that of FIGURE 1. The FIGURE 2 illustration differs from that of FIGURE 1 only in that it shows the source of heat 24 packed in the borehole 13 with a granular siliceous material 32, such as sand or gravel.

The method of the present invention will now be exemplified with reference to the drawings. Upon encountering the unconsolidated siliceous formation 11, water or other aqueous liquid may be withdrawn from the reservoir 22 and introduced into the sand formation through the pump 21. Where substantial amounts of interstitial water are present in the unconsolidated formation, the introduction of aqueous liquid may be omitted.

When the unconsolidated formation 11 surrounding the borehole contains at least about 30% by weight of aqueous liquid, the source of heat 24 is lowered into a position adjacent thereto. Raising and lowering of the source of heat is accomplished through movement of the traveling block 27 and/or activation of the reeling mechanism 29. The depth of the unconsolidated formation may be determined by a conventional depth measuring device used with a logging apparatus, such as, self-potential, resistivity, acoustic or neutron type logs. Upon being lowered to the position adjacent the unconsolidated formation, the source of heat is activated thruogh power source 28 to raise the temperature of the unconsolidated formations and aqueous liquid in the immediate vicinity of the borehole. Raising the temperature of the aqueous liquid increases the solubility of silica (generally in the form of sand) in the liquid and causes a portion of silica in the formation to dissolve in the liquid. After raising the temperature in the immediate vicinity of the borehole to a temperature which is greater than about 400° F. and greater than the ambient temperature of the formation, the temperature is maintained at a sufficient time (generally a few hours) to permit a substantial portion of silica to dissolve in the liquid and form a solution therewith. Below the critical temperature the heated aqueous liquid may be maintained in the liquid state by holding the formation under sufficient pressure, which pressure may naturally occur at the depth of the formation. It is to be understood, however, that the method functions equally well where the aqueous liquid enters the vapor state, such as necessarily occurs when the liquid is heated above the critical temperature. The source of heat is then deactivated to permit the solution to cool to normal formation temperature and precipitate and deposit the portion of silica dissolved therein onto the surfaces and grain contact points of undissolved granular aggregates of the unconsolidated formation and the interstices therebetween. This precipitation produces the consolidated portion of the siliceous formation designated as 14 in the illustration. Consolidated portion 14 is a relatively hard and permeable mass capable of permitting crude oil withdrawal therethrough while restricting intrusion of unconsolidated granular aggregates of the formation.

A single heating and cooling cycle may be sufficient to provide an adequate consolidation. However, if desired, a number of cycles can be used to increase the density and/or thickness of the layer of silica deposited on the consolidated portion. The amount of silica dissolved by each heat cycle increases with increases in the temperature to which the aqueous liquid is heated, and particularly satisfactory consolidations are obtained by heating such liquids to temperatures of about 750° F. Where desirable, the aqueous liquid can be heated by means of a surface-located source of heat and pumped through the well conduits into contact with silica in the vicinity of the unconsolidated formation; for example, by generating steam at the surface and condensing the steam in a reservoir sand at a temperature exceeding the formation temperature.

The amount of silica which can be dissolved and made available for subsequent precipitation and redeposition can be increased in a slightly alkaline solution. The aqueous liquid used in the present process is preferably an alkaline liquid having a pH of at least about 8. Particularly suitable aqueous liquids comprise interstitial waters having such a pH, dilute aqueous solution of bases, such as ammonia or the alkali metal hydroxides, a water-soluble salt of a strong base and a weak acid, such as the alkali metal carbonates, etc. If the interstitial water present in the formation is not sufficiently alkaline, the alkaline content can be increased by injecting an alkaline solution into the borehole and surrounding formation through use of the pump 21.

In some instances, particularly when relatively thick unconsolidated formations are encountered, it is desirable to move the source of heat 24 longitudinally within the borehole during the heating thereof. Preferably, the source of heat is activated at a position somewhat lower (one foot, for example) than the uppermost point of the formation to be consolidated. This results in convection currents within the formation moving upward and radially outward into the relatively cooler regions thereof, causing silica precipitation and consolidation in these cooler regions. In order to continue this precipitation along the length of the unconsolidated formation, the source of heat is moved downward (continuously or by increments) at a low velocity (for example, one foot per hour). The source of heat is deactivated upon reaching a position below the unconsolidated formation. This procedure can be reversed, recycled and/or used with the aforementioned method wherein the source of heat is merely positioned adjacent the unconsolidated formation.

The present invention can be practiced by depositing a granular siliceous material in a borehole of a well and forcing a heated liquid to flow through that material into the unconsolidated earth formation. This procedure can be employed to consolidate unconsolidated earth formations which contain substantially no siliceous materials. FIGURE 2 illustrates an apparatus suitable for this procedure. The source of heat 24 is surrounded by a porous pack 32 of a granular siliceous material, such as sand or gravel, and is activated to heat aqueous liquid in the borehole and in the formation. Where it is desirable to produce a consolidated zone 14, in the form of a relatively thin sheath around the borehole 13, the bottom hole pressure of the fluid in the borehole is kept substantially equal to the formation fluid pressure. With such a pressure balance, the heat sets up a convection current in which the aqueous liquid moved through the pack 14 up along the surface of the source of heat outward into formation 11, downward through formation 11, and back into the pack 14 and upward along the source of heat. Alternatively, where it is desirable to radially extend the consolidated zone 14, fluid is pumped into the borehole, heated and contacted with silica in the pack 14, and injected into the formation 11 where it cools and precipitates silica.

It is to be understood that the method of the present invention may be practiced in boreholes where there is little or no fluid communication between the borehole and the formation therearound. This situation may arise in an open borehole coated with a substantially impermeable mud cake or in boreholes having an unperforated casing therein, as illustrated at the upper end of the sand formation illustrated in FIGURE 1. In such cases it is only necessary that the unconsolidated formation is siliceous and contains sufficient interstitial water. The fluid within the borehole merely acts as a means to conduct heat to the formation.

The method of the invention may also be practiced in boreholes where fluid within the borehole continually pentrates into the unconsolidated formation surrounding the borehole. In this case, fluid loss into the formation is reduced by reducing the fluid pressure in the borehole to slightly above the formation pressure and maintaining this low level throughout the heating period. Silica dissolved in the fluid in the borehole will, therefore, be transported into cooler regions of the unconsolidated formation by the slowly moving filtrate penetrating the formation. Upon reaching the cooler regions, the dissolved silica will precipitate and consolidate the grandual aggregates of the formation within the regions. Under these circumstances, saturating the fluid within the borehole with silica through packing with a silceous material, as described above, produces particularly effective results. Since temperature gradients are very high near the borehole, the region of precipitation and consolidation will be very near the wall of the borehole. For example, the region may be only one inch from the point at which the filtrate enters the wall of the borehole.

The foregoing description of the invention is merely intended to be explanatory thereof. Various changes in the details of the described method may be made, within the scope of the appended claims, without departing from the spirit of the invention.

We claim as our invention:

1. A method of consolidating granular aggregates surrounding a borehole penetrating an unconsolidated subterranean reservoir formation in the presence of silica comprising:
    (a) contacting said formation with a heated aqueous liquid at a temperature sufficient to dissolve some of said silica present, said liquid being under a pressure which is at least equal to the pressure of said reservoir formation; and
    (b) cooling said heated aqueous liquid containing dissolved silica to cause said dissolved silica to precipitate onto said granular aggregate surrounding said borehole thereby consolidating contiguous granular aggregates in contact with said heated aqueous liquid.

2. A method according to claim 1 wherein the silica is present in the formation.

3. A method according to claim 1 wherein granular silica is added via the borehole to provide the necessary silica for the consolidation of granular aggregates.

4. A method according to claim 1 wherein the temperature of said aqueous liquid is at least 400° F.

5. A method according to claim 1 wherein the heated aqueous liquid contains dissolved silica when injected into the borehole.

6. A method of consolidating granular aggregates sursurounding a borehole penetrating an unconsolidated silica-bearing subterranean reservoir formation comprising:
    (a) introducing a liquid which is at least 30% aqueous into said borehole at a pressure at least equal to the pressure of said reservoir formation;
    (b) heating said liquid introduced into said borehole by a heating source in said borehole to a temperature at least 400° F. to dissolve some of said silica in said formation; and
    (c) deactivating said heating source to allow said liquid to cool and precipitate dissolved silica onto said granular aggregates surrounding said borehole thereby consolidating contiguous aggregates contacted by said liquid.

7. A method according to claim 6 wherein the aqueous liquid introduced into the formation is alkaline.

8. A method according to claim 6 wherein granular silica material is added via the borehole and contacted by the liquid during the heating of said liquid.

9. A method according to claim 8 wherein the pressure in said borehole is increased subsequent to the deactivation of the heat source to force the heated liquid further into said formation to increase the volume of consolidation.

References Cited by the Examiner

UNITED STATES PATENTS

| | | | |
|---|---|---|---|
| 1,379,656 | 5/21 | Swan | 166—25 |
| 2,771,952 | 11/56 | Simm | 166—29 X |
| 3,004,597 | 10/61 | Marx et al. | 166—11 |
| 3,010,513 | 11/61 | Gerner | 166—11 |
| 3,070,159 | 12/62 | Marx | 166—25 X |
| 3,104,704 | 9/63 | Ortloff et al. | 166—11 X |

OTHER REFERENCES

Page 105, 1949, "Physical Principles of Oil Production," Morris Muscat, McGraw-Hill Book Company, Inc., New York, N.Y.

Page 587, 1954–1955, "Handbook of Chemistry and Physics" (Hodgman et al.), 36th edition, Chemical Rubber Publishing Co., Cleveland, Ohio.

CHARLES E. O'CONNELL, *Primary Examiner.*

BENJAMIN HERSH, *Examiner.*